United States Patent [19]

Xu et al.

[11] Patent Number: 6,088,473
[45] Date of Patent: Jul. 11, 2000

[54] METHOD AND COMPUTER READABLE MEDIUM FOR AUTOMATED ANALYSIS OF CHEST RADIOGRAPH IMAGES USING HISTOGRAMS OF EDGE GRADIENTS FOR FALSE POSITIVE REDUCTION IN LUNG NODULE DETECTION

[75] Inventors: Xin-Wei Xu, Darien; Kunio Doi, Willowbrook, both of Ill.

[73] Assignee: Arch Development Corporation, Chicago, Ill.

[21] Appl. No.: 09/027,685

[22] Filed: Feb. 23, 1998

[51] Int. Cl.[7] .................................................. G06K 9/62
[52] U.S. Cl. ........................ 382/132; 382/156; 382/168; 382/199; 600/408
[58] Field of Search .................................. 382/132, 168, 382/199, 156; 128/922, 925; 600/408, 407

[56] References Cited

U.S. PATENT DOCUMENTS

| | | | |
|---|---|---|---|
| 4,907,156 | 3/1990 | Doi et al. | 382/132 |
| 5,289,374 | 2/1994 | Doi et al. | 382/132 |
| 5,319,549 | 6/1994 | Katsuragawa et al. | 382/132 |
| 5,343,390 | 8/1994 | Doi et al. | 382/132 |
| 5,491,627 | 2/1996 | Zhang et al. | 600/408 |
| 5,790,690 | 8/1998 | Doi et al. | 382/199 |
| 5,832,103 | 11/1998 | Giger et al. | 382/132 |

OTHER PUBLICATIONS

X.W. Xu, K. Doi, T. Kobayashi, H. MacMahon, and M.L. Giger, "Development of an Improved CAD Scheme for Automated Detection of Lung Nodules in Digital Chest Images," Med. Phys. 24, 1395–1403 (1997).

X.W. Xu, H. MacMahon, M.L. Giger, and K. Doi, "Adaptive Feature Analysis of False Positives for Computerized Detection of Lung Nodules in Digital Chest Images" SPIE Medical Imaging 1997, Image Processing vol. 3034 428–436 (1997).

K. Doi, M.L. Giger, H. MacMahon, K.R. Hoffmann, S. Katsuragawa, R.M. Nishikawa, Y. Yoshimura, S. Sanada, X. Chen, C.E. Metz, C.J. Vyborny, R.A. Schmidt, S.M. Montner, T. Matsumoto, and K.G. Chua, "Computer–aided Diagnosis: Present and Future, A New Horizon on Medical Physics and biomedical Engineering", H. Abe, K. Atsumi, T. Iinuma, M. Saito, and M. Inoue, editors; Elsevier Science Publishers B.V. 1991.

(List continued on next page.)

*Primary Examiner*—Jon Chang
*Attorney, Agent, or Firm*—Oblon, Spivak, McClelland, Maier & Neustadt, P.C.

[57] ABSTRACT

An automated method, and a computer storage medium storing instructions for executing the method, for analysis of image features in lung nodule detection in a chest radiographic image represented by digital data, including preprocessing the image to identify candidate nodules in the image; establishing a region of interest (ROI) including a candidate nodule identified in the preprocessing step; performing image enhancement of the candidate nodule within the ROI; obtaining a histogram of accumulated edge gradients as a function of radial angles withing the ROI after performing the image enhancement; and determining whether the candidate nodule is a false positive based on the obtained histogram. A 64×64-pixel region of interest (ROI) centered at the candidate location is used. The contrast of the ROI is improved by a two-dimensional background subtraction. A nodule shape matched filter is used for enhancement of the nodular pattern located in the central area of the ROI. Analysis of the histogram resulted in identification of seven features, including (1) a maximum histogram value, (2) a minimum histogram value, (3) a partial average value of the histogram, (4) a standard deviation of the histogram values near the radial axis, (5) a partial standard deviation of histogram values, (6) a width of the histogram including both sides from zero degrees of the radial angle, at a predetermined histogram value, and (7) a ratio of a maximum histogram value near the radial axis to a maximum histogram value in two predetermined outside ranges of the radial axis, useful for the identification and elimination of false positives.

48 Claims, 13 Drawing Sheets

OTHER PUBLICATIONS

K. Doi, M.L. Giger, R.M. Nishikawa, K.R. Hoffmann, H. MacMahon, R.A. Schmidt, and K.G. Chua, "Digital Radiography: A Useful Clinical Tool for Computer–aided Diagnosis by Quantitative Analysis of Radiographic Images," Acta Radiologica 34, 426–439 (1993).

M.L. Giger, K. Doi, and H. MacMahon, "Image Featrue Analysis and Computer–aided Diagnosis in Digital Radiography. 3. Automated Detection of Nodules in Peripheral Lung Fields," Med. Phys. 15, 158–166 (1988).

M.L. Giger, K. Doi, H. MacMahon, C.E. Metz, and F.F. Yin, "Pulmonary Nodules: Computer–aided Detection in Digital Chest Image," RadioGraphics 10, 41–51 (1990).

Y.C. Wu, K. Doi, M.L. Giger, C.E. Metz, and W. Zhang, "Reduction of False Positives in Computerized Detection of Lung Nodules in Chest Radiographs Using Artificial Neural Networks, Discriminate Analysis and a Rule–Based Scheme," J. of Digital Imag 7, 196–207 (1994).

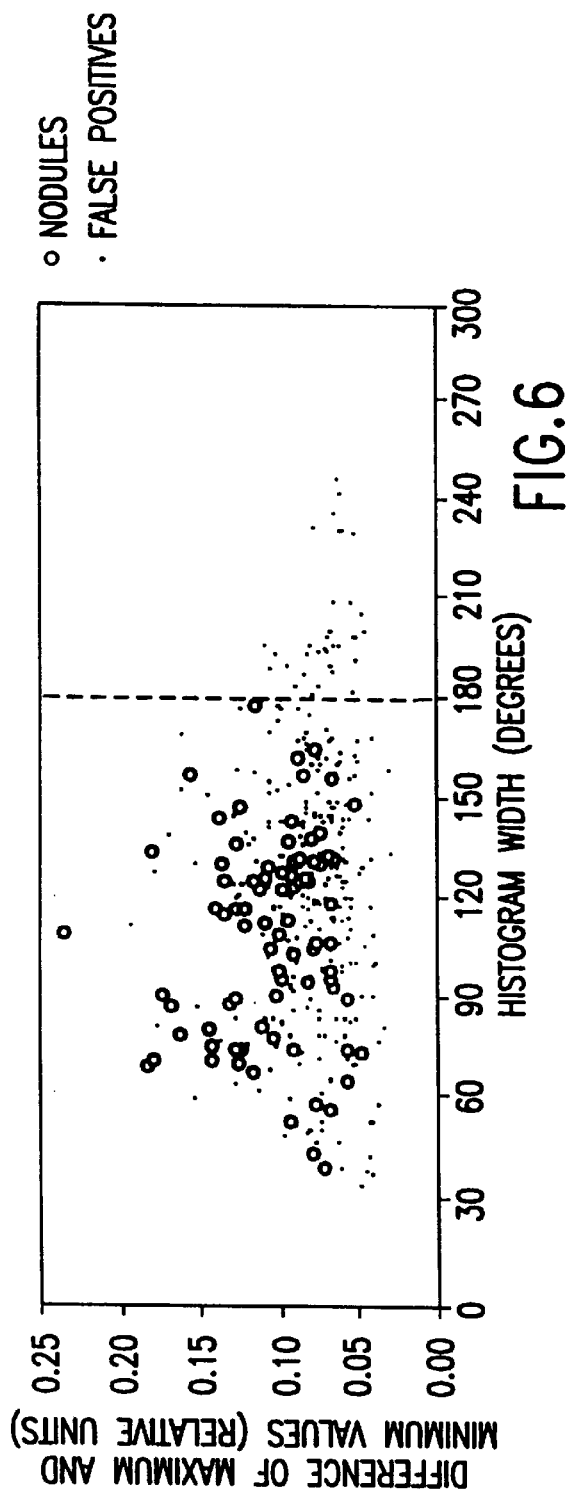
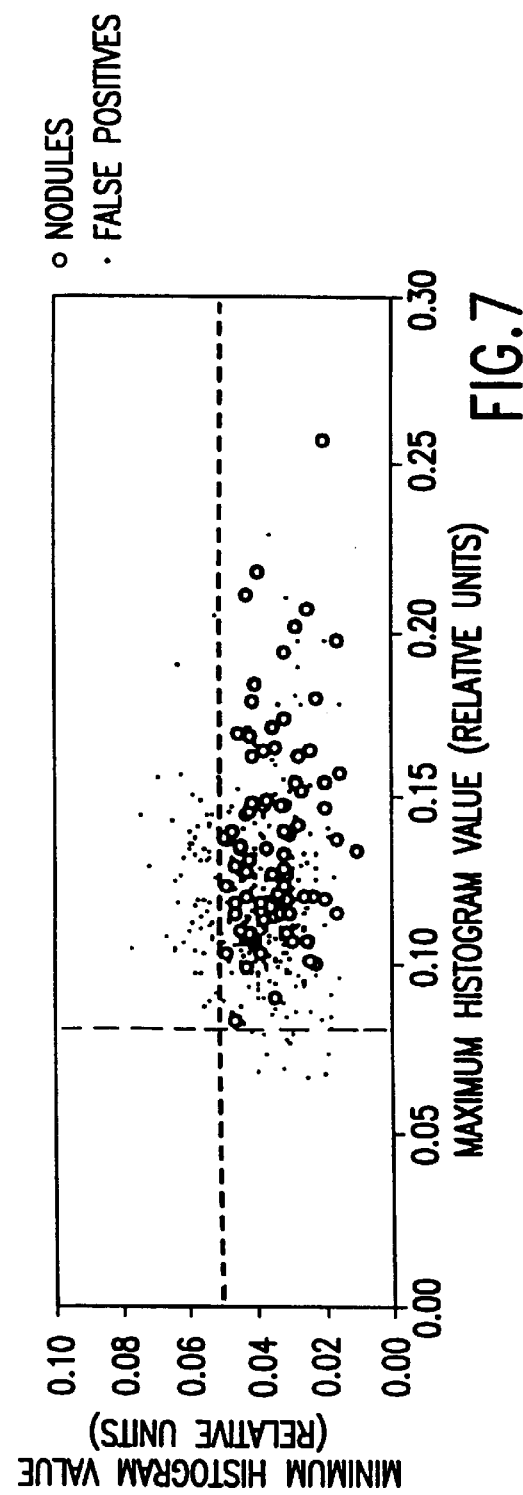
FIG.6
FIG.7

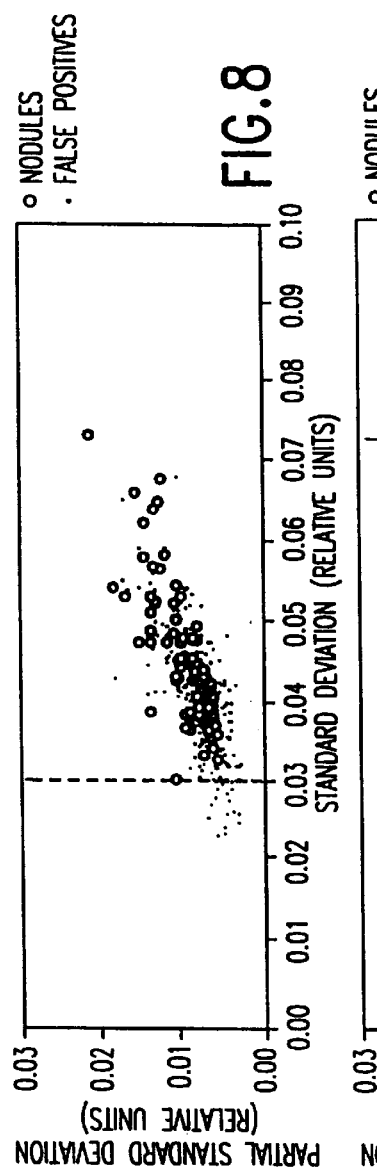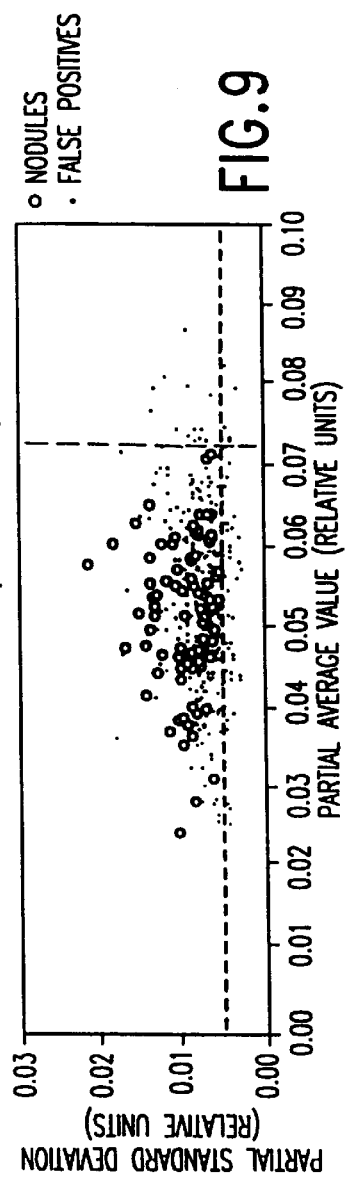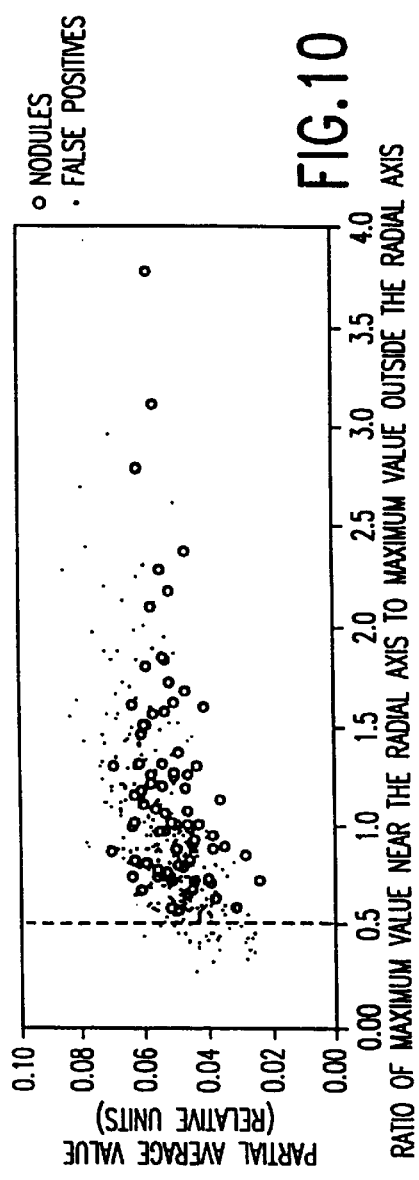

METHOD AND COMPUTER READABLE MEDIUM FOR AUTOMATED ANALYSIS OF CHEST RADIOGRAPH IMAGES USING HISTOGRAMS OF EDGE GRADIENTS FOR FALSE POSITIVE REDUCTION IN LUNG NODULE DETECTION

CROSS-REFERENCE TO RELATED APPLICATIONS

The present is related to automated techniques for automated detection of abnormalities in digital images, for example as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,790,690; 5,832,103; 5,873,824; 5,881,124; and 5,931,780; as well as U.S. application Ser. Nos. 08/173,935 filed Dec. 28, 1993; 08/398,307 filed Mar. 3, 1995; 08/523,210 filed Sep. 5, 1995; 08/536,149 filed Sep. 29, 1995; 08/562,087 filed Nov. 22, 1995; 08/757,611 filed Nov. 29, 1996; 08/900,188 filed Jul. 25, 1997; 08/900,189 filed Jul. 25, 1997; 08/900,191 filed Jul. 25, 1997; 08/900,192 filed Jul. 25, 1997; 08/900,361 Jul. 25, 1997; 08/900,362 filed Jul. 25, 1997; 08/979,623 filed Nov. 28, 1997; 08/979,639 filed Nov. 28, 1997; 08/982,282 filed Dec. 1, 1997; 09/028,518 filed Feb. 23, 1998; 09/027,685 filed Feb. 23, 1998, which are incorporated herein by reference in their entirety. Of these patents and patent applications, U.S. Pat. No. 4,907,156 and U.S. patent application Ser. No. 08/562,087 are especially pertinent.

The present invention also relates to technologies referenced and described in the references identified in the appended APPENDIX and cross-referenced throughout the specification by reference to the number, in brackets, of the respective reference listed in the APPENDIX, the entire contents of which are also incorporated herein by reference. Various of these publications may correspond to various of the cross-referenced patents and patent applications.

STATEMENT REGARDING FEDERALLY SPONSORED RESEARCH

The present invention was made in part with U.S. Government support under grant CA 62625 from the USPHS. The U.S. Government has certain rights in the invention.

BACKGROUND OF THE INVENTION

1. Field of the Invention

The present invention relates to an automated method and apparatus for lung nodule detection in chest radiographs, and more particularly to an automated method and apparatus in which lung nodules are detected in chest radiographs with a reduction in false positive detection.

2. Discussion of the Background

X-ray chest radiography is the most commonly used radiological imaging modality for detection of solitary subtle lung nodules in patients because of the low radiation does, low cost, and reliability. Solitary lung nodules in chest images are one of the important signs of primary lung cancer, which is the leading cause of cancer death in men and women in the United States.[1,2] However, it is well known that radiologists may fail to detect lung nodules in as many as 20 to 30% of actually positive cases viewed retrospectively.[3–6] In an effort to help radiologists to improve their diagnostic accuracy, at the Department of Radiology at the University of Chicago (UC), a computer-aided diagnosis (CAD) scheme for automated detection of lung nodules in chest images, as disclosed in above-noted U.S. patent application Ser. No. 08/562,087, has been developed.[7,8] A radiologist may use the computer output as a second opinion in making his/her diagnosis.[9,10]

The UC CAD scheme begins with a difference image technique, as disclosed in U.S. Pat. No. 4,907,156 [11], in which a nodule-suppressed image is subtracted from a nodule-enhanced image to produce a so-called difference image for reduction of normal background structures in the chest image. Nodule candidates in the chest image are selected by multiple gray-level thresholding of the difference image.[7,12] The derived nodule candidates are then classified into six groups according to the levels used by the multiple gray-level thresholding. The adaptive rule-based image feature analysis method is applied to nodule candidates in each group for removal of the corresponding false positives in each group. Finally, an artificial neural network (ANN) is trained to identify the candidates remaining after the rule-based tests.[7,8] For the UC database, which consisted of 200 PA chest images, including 100 normals and 100 abnormals (with 122 confirmed nodules), the prior UC CAD scheme achieves a performance of 70% sensitivity with 1.7 false positives per chest image.

It has been found that the majority of false-positive detections resulting from the prior UC CAD scheme are related to rib—rib or rib-vessel crossings, and that some others are due to shadows of soft tissues such as breast, heart, and diaphragm. The prior UC method for elimination of false-positive detections in the CAD scheme is based on gray levels and morphologic features obtained by the region-growing technique. These image features are derived from both the difference image and the original chest image.[7,8]

SUMMARY OF THE INVENTION

Accordingly, an object of this invention is to improve upon the prior UC CAD scheme, by reducing the number of false positives in the automated detection of lung nodules in chest radiographs.

Another object of this invention is to provide a novel method and apparatus for the automated detection of lung nodules in chest radiographs, utilizing a set of new features derived from the analysis of the histogram of accumulated radial edge gradients in an effort to improve the performance of the prior UC CAD scheme further by reducing the number of false positives.

These and other objects are achieved according to the present invention by providing a novel automated method and apparatus for the detection of lung nodules in chest radiographs, by incorporating new features derived from analysis of the histogram of radial edge gradients on nodule candidates. The present invention includes the recognition that approximately 80% of false positives are due to rib—rib or rib-vessel crossings, and also to interactions between ribs and soft tissues, such as breast, cardiac, or diaphragm shadows. A 64×64-pixel region of interest (ROI) centered at the candidate location is selected first. The contrast of the ROI is improved by a two-dimensional background subtraction. A nodule shape matched filter is used for enhancement of the nodular pattern located in the central area of the ROI. A histogram of accumulated edge gradients as a function of the radial angles is obtained. Analysis of the histogram results in seven features, including the maximum, minimum, width, and standard deviation of the histogram in a selected range of radial angles. The histogram from a "true" nodule ROI tends to have a narrow, prominent peak with a large maximum value near the radial axis. However, the rib structures generally broaden the corresponding histogram, thus resulting in a large width and a high minimum value. Features derived from the histogram are used for identifying some subtle and difficult false positives that can not be eliminated by the prior UC CAD scheme. A rule-based test, combining all seven features, is applied with the elimination of 138 (40%) of 340 false positives without any loss of nodules. Then, an artificial neural network (ANN) is applied to remove an additional 8% of the remaining false positives with a reduction of 5% of true nodules, whereby the performance of prior UC CAD scheme is improved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is an illustration of the relationship between the histogram width and the difference between the maximum and the minimum value, for nodules and false positives;

FIG. 7 is an illustration of the relationship between the maximum and minimum values for nodules and false positives;

FIG. 8 is an illustration of the relationship between the standard deviation and the partial standard deviation for nodules and false positives;

FIG. 9 is an illustration of the relationship between the partial average value and the partial standard deviation for nodules and false positives; and FIG. 10 is an illustration of the relationship between the ratio of two maximum values near and outside the radial axis and the partial average value for nodules and false positives;

DETAILED DESCRIPTION OF THE PREFERRED EMBODIMENTS

The database employed in derivation of the present invention included 200 posterior-anterior (PA) chest radiographs, each 14"×17". There were one hundred abnormal cases with a total of 122 nodules (confirmed by CT scans or radiographic follow-up) and one hundred normal cases (all verified by CT scans). The digitization procedure of the films as well as the size, contrast, and the subjective subtle rating of the 122 nodules are well documented elsewhere.[7,8] In the new study resulting in derivation of the present invention, the nodule candidates resulting from the prior UC CAD scheme were used. It is noted that, for this database, the prior scheme had a performance of 70% sensitivity with 1.7 false positives per chest image. Therefore, a total of 426 candidates (86 of 122 confirmed nodules and 340 false positives) produced by the scheme were used.

Figure 1A:
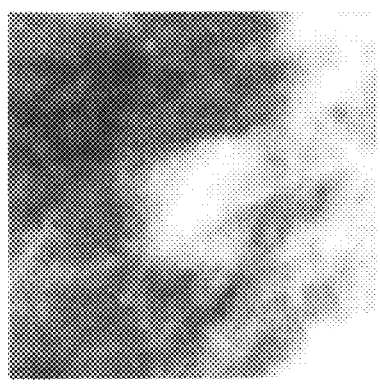
FIGS. 1(a), 1(b) and 1(c) are illustrations of a region of interest (ROI) in a lung image with a nodule overlapped with a posterior rib, respectively illustrating (a) an original ROI; (b) the same ROI with background subtracted; (c) the same ROI after matched filtering.
Figure 1B:
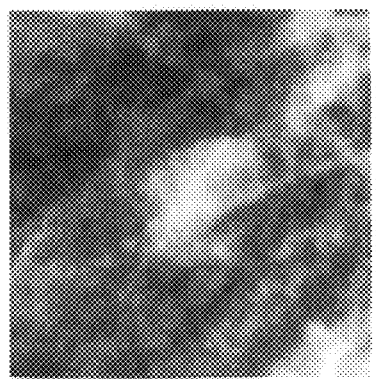
Figure 1C:
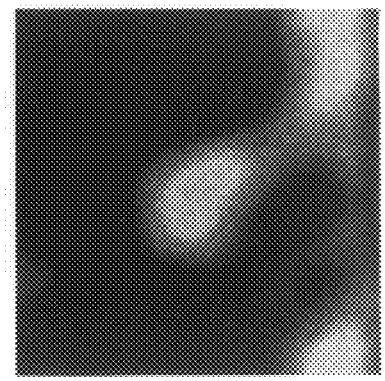

A 64×64-pixel region of interest (ROI) with a pixel size of approximately 0.7 mm centered at the candidate location was used in the new study. FIG. 1(a) shows the ROI of a nodule that overlaps a posterior rib. It is seen that the contrast of the nodule pattern is relatively low. To increase the contrast of the nodule, for each pixel in the ROI, the background subtraction was applied by using the average pixel value. This average value was obtained by taking the average of the pixel values along the column and also the row which were through that pixel. The increase in contrast of the nodule pattern by means of the background subtraction technique is demonstrated in FIG. 1(b). A 9 mm nodule shape matched filter was then used to enhance the nodule pattern in the ROI further, as shown in FIG. 1(c). The operation of this filtering was performed in the frequency domain by using Fast Fourier Transform (FFT).[13] It is clear in FIG. 1(c) that the signal-to-noise ratio of the nodule pattern at the center of the ROI was enhanced considerably.

After the preprocessing by which the nodular pattern in the ROI was enhanced, the edge gradient, G, at each pixel was calculated by use of a 3×3 Sobel filter.[14] By accumulating edge gradients obtained from all pixels in the ROI, at each bin of different radial angles, the histogram of accumulated radial edge gradients was obtained. The radial angle ($\beta$) of the edge gradient G at a pixel is defined as the angle between the direction for the maximum edge gradient and the radial axis, which passes through the origin ($x_0$, $y_0$) of the ROI and that pixel ($x_1$, $y_1$), as illustrated in FIG. 2. In FIG. 2, the location ($x_0$, $y_0$) is the center (or origin) of the ROI, and ($x_1$, $y_1$) is the point where the edge gradient is considered. The radial angle is zero when the direction of the maximum edge gradient agrees with the radial axis, and has a range from −180° to 180°. The radial angle is positive when the gradient G rotates from the radial axis, around the point ($x_1$, $y_1$), counterclockwise and negative when it rotates from the radial axis clockwise. The radial edge gradient histogram describes the orientations of edge gradients relative to the radial axis. If an ideal round shape nodule with a Gaussian distribution would be located at the center of the ROI, the corresponding histogram will have a sharp peak at the radial angle of zero, because the direction of the edge gradient at every pixel inside the nodule pattern aligns with the radial axis. The histogram of radial edge gradients for the nodule ROI shown in FIG. 1 is plotted in FIG. 1(d). It is seen that the prominent peak in the histogram is shifted slightly to a radial angle of approximately 30°. This is probably because the shape of the nodule is close to an ellipse rather than a circle.

According to the present invention, a total of seven features were derived by analysis of the histogram of accumulated radial edge gradients for the purpose of elimination of some "difficult" false positives which could not be removed by the prior CAD scheme. These features are: (1) the maximum histogram value (or the maximum value) near the radial axis, which is defined here for a range of the radial angles from −90° to +90°; (2) the minimum histogram value (or the minimum value) near the radial axis; (3) the partial average value, which is the average of the histogram values between the minimum and 65% of the maximum; (4) the standard deviation of histogram values near the radial axis; (5) the standard deviation of histogram values used for the calculation of the partial average value (this standard deviation is referred to as the partial standard deviation); (6) the width of the histogram (in terms of degrees) including both sides from zero degree of the radial angle, at the histogram value corresponding to 35% of the difference between the maximum and the minimum value; (7) the ratio of the maximum value near the radial axis to the maximum value in the two outside ranges, corresponding to the range of the radial angles from −180° to −90° and from 90° to 180°. Hereinafter, these features are discussed in detail in terms of their properties as well as their usefulness in distinguishing between lung nodules and false positives.

Figure 1D:
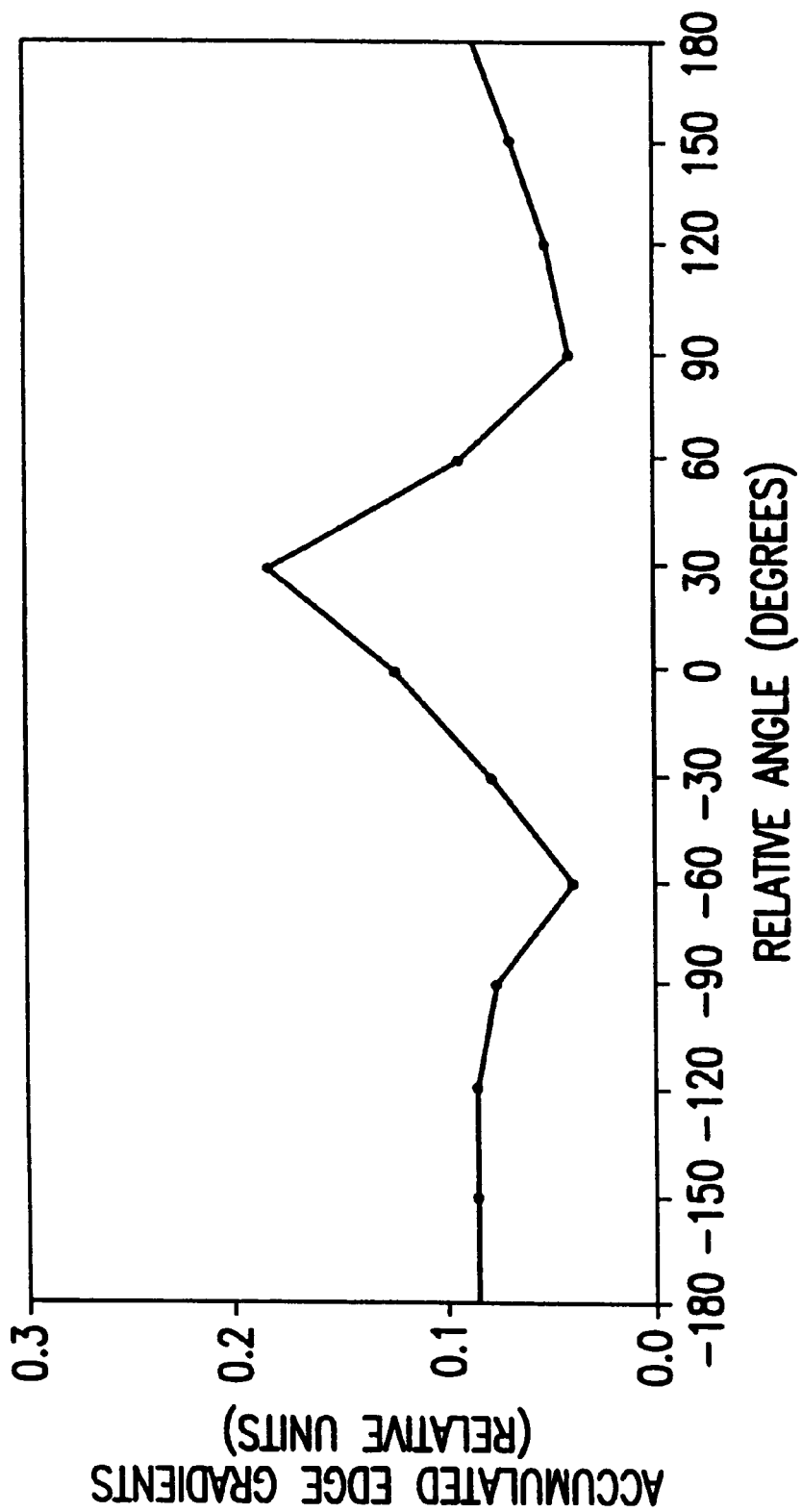
FIG. 1(d) is a graph of the radial edge gradient histogram of the filtered ROI illustrated in FIG. 1(c)
Figure 2:
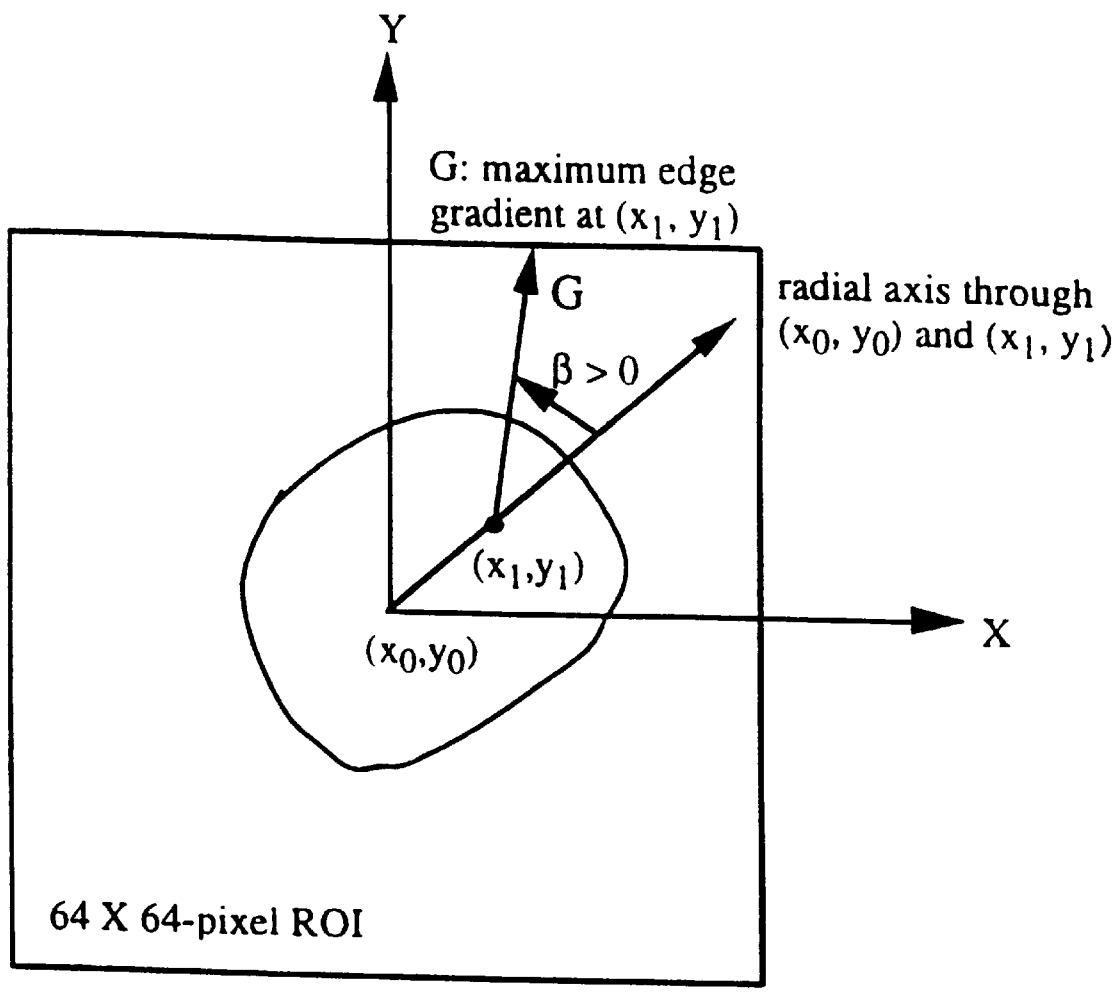
FIG. 2 is an illustration of geometric parameters defining the radial angle ($\beta$) for the edge gradient G at a pixel ($x_1$, $y_1$)
Figure 3A:
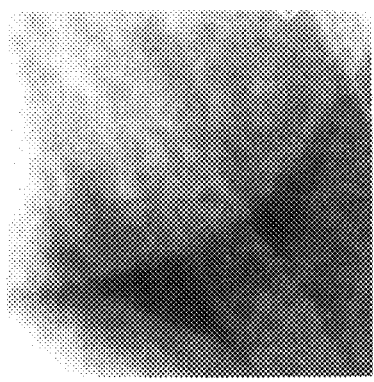
FIGS. 3(a), 3(b) and 3(c) are illustrations of a false positive ROI due to the interaction between the rib and breast shadow, respectively illustrating (a) an original ROI, (b) a ROI with background subtracted, and (c) a ROI after matched filtering.
Figure 3B:
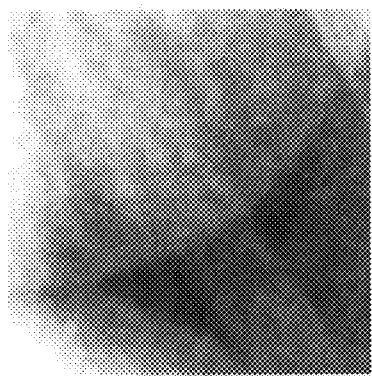
Figure 3C:
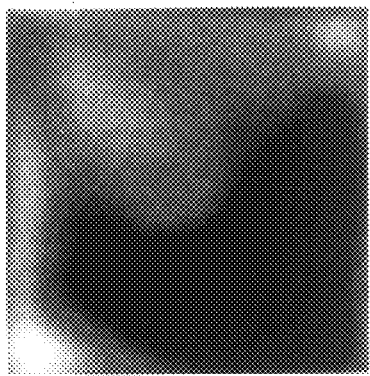
Figure 3D:
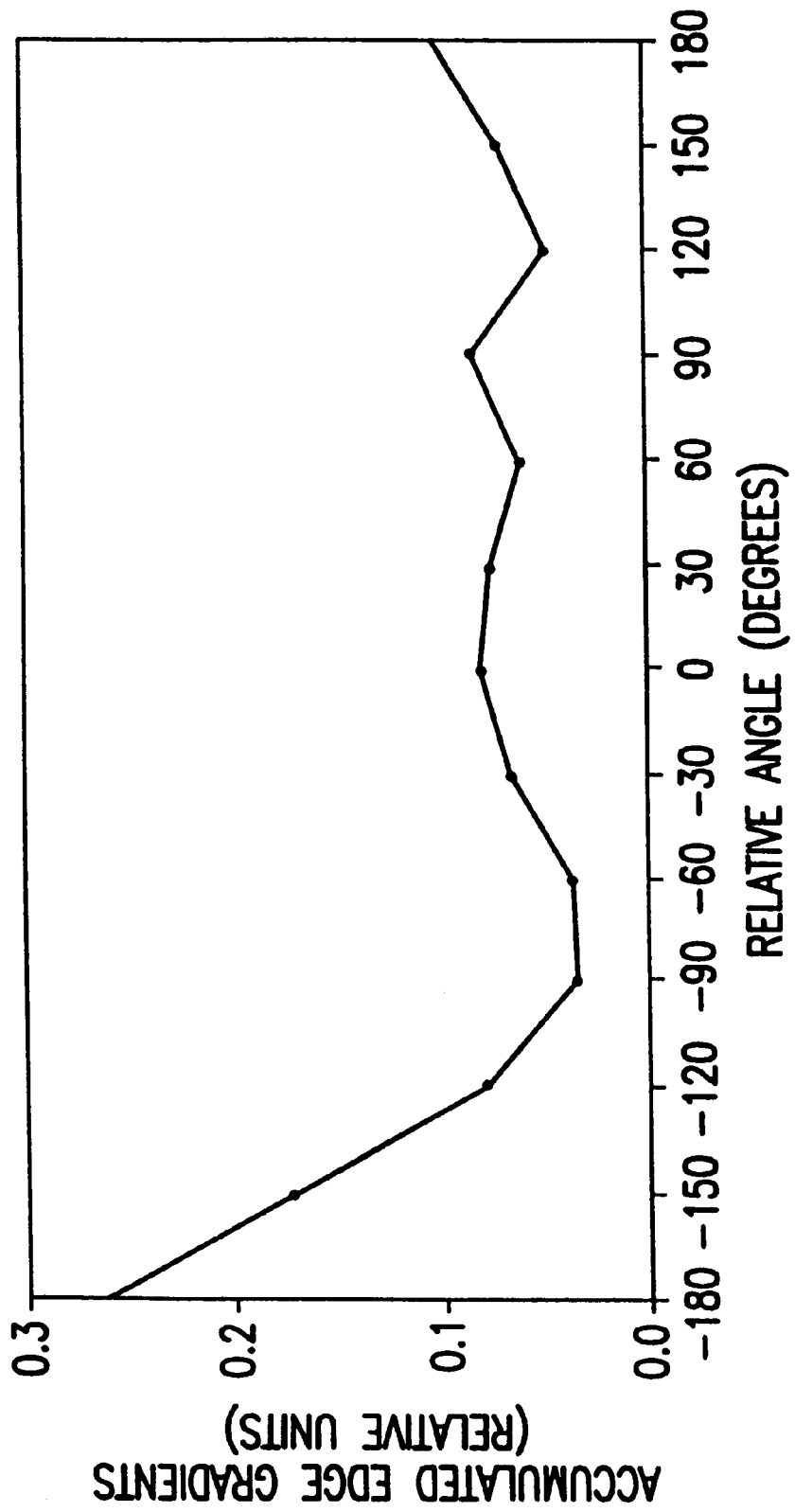
FIG. 3(d) is a graph illustrating the radial edge gradient histogram of the filtered ROI in FIG. 3(c)
Figure 4A:
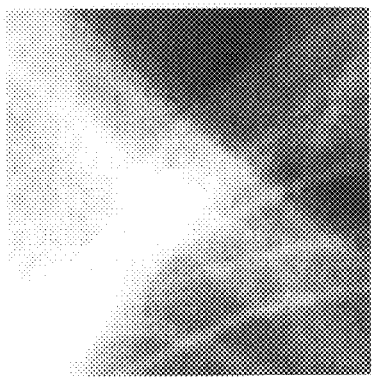
FIGS. 4(a), 4(b) and 4(c) are illustrations of a false positive ROI due to crossings of rib-clavicle or rib—rib, respectively illustrating (a) an original ROI, (b) a ROI with background subtracted, and (c) a ROI after matched filtering.
Figure 4B:
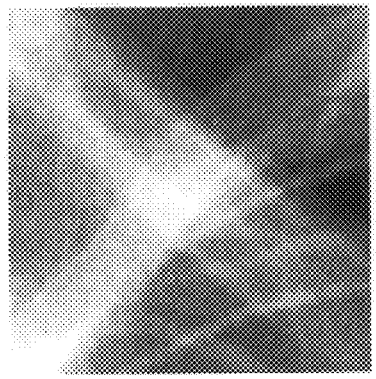
Figure 4C:
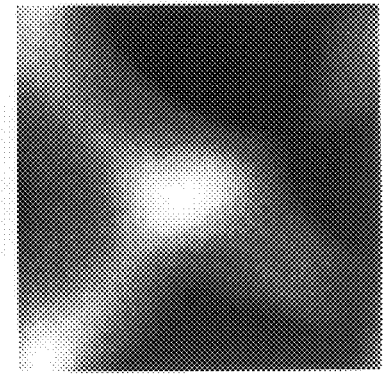
Figure 4D:
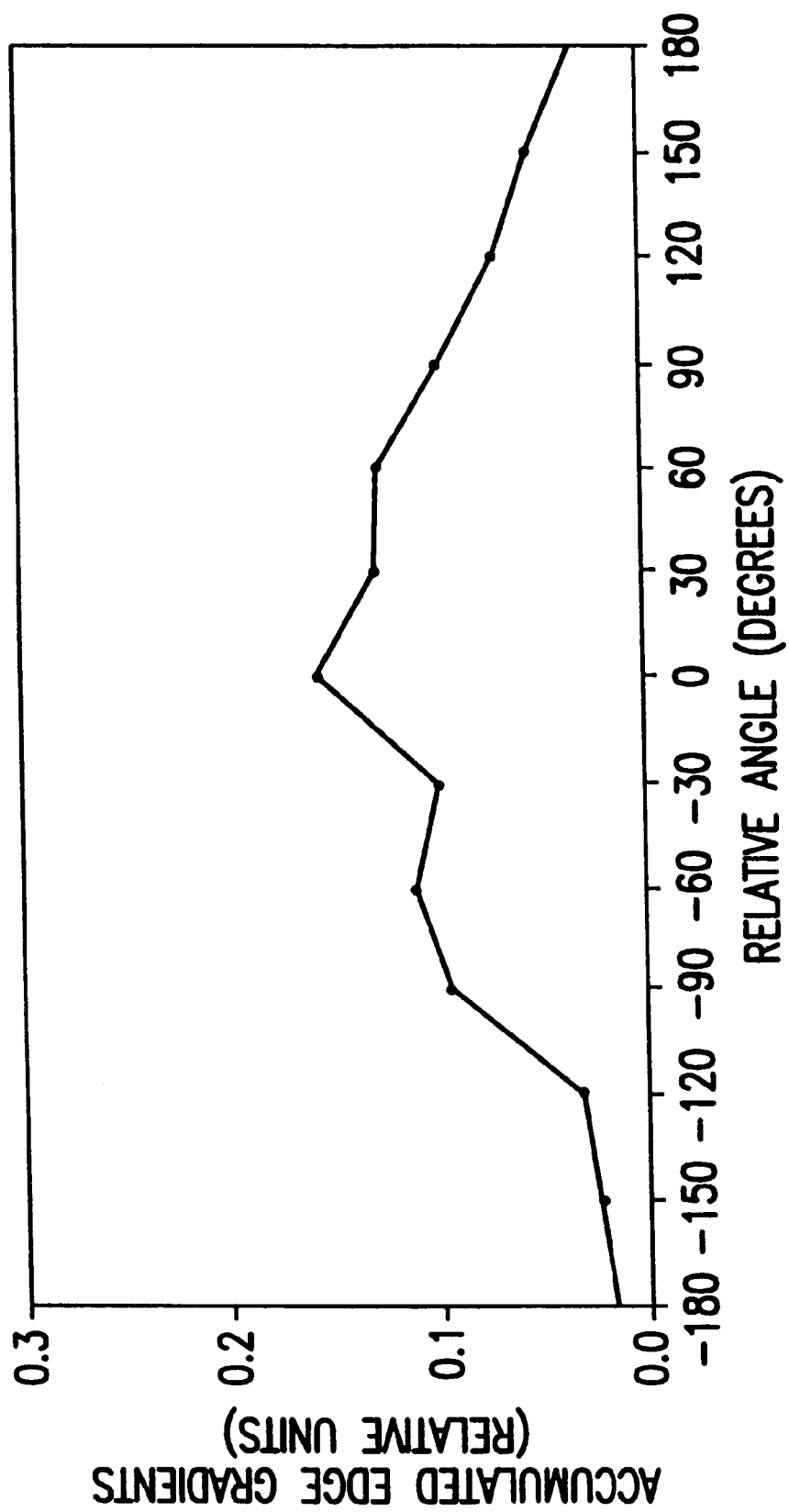
FIG. 4(d) is a graph illustrating the radial edge gradient histogram of the filtered ROI in FIG. 4(c)
Figure 5A:
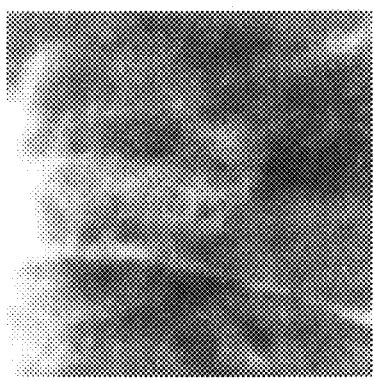
FIGS. 5(a), 5(b) and 5(c) are illustrations of a false positive ROI due to rib-vessel crossing, respectively illustrating (a) an original ROI, (b) a ROI with background subtracted, and (c) a ROI after matched filtering.
Figure 5B:
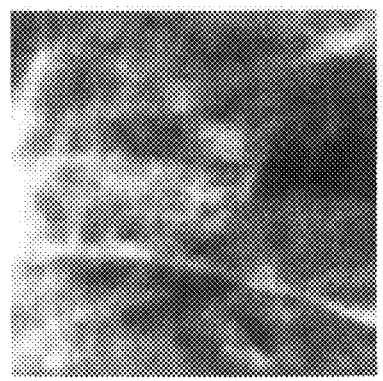
Figure 5C:
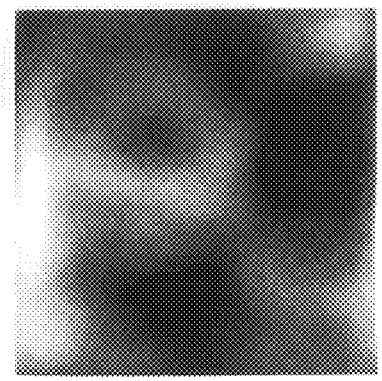
Figure 5D:
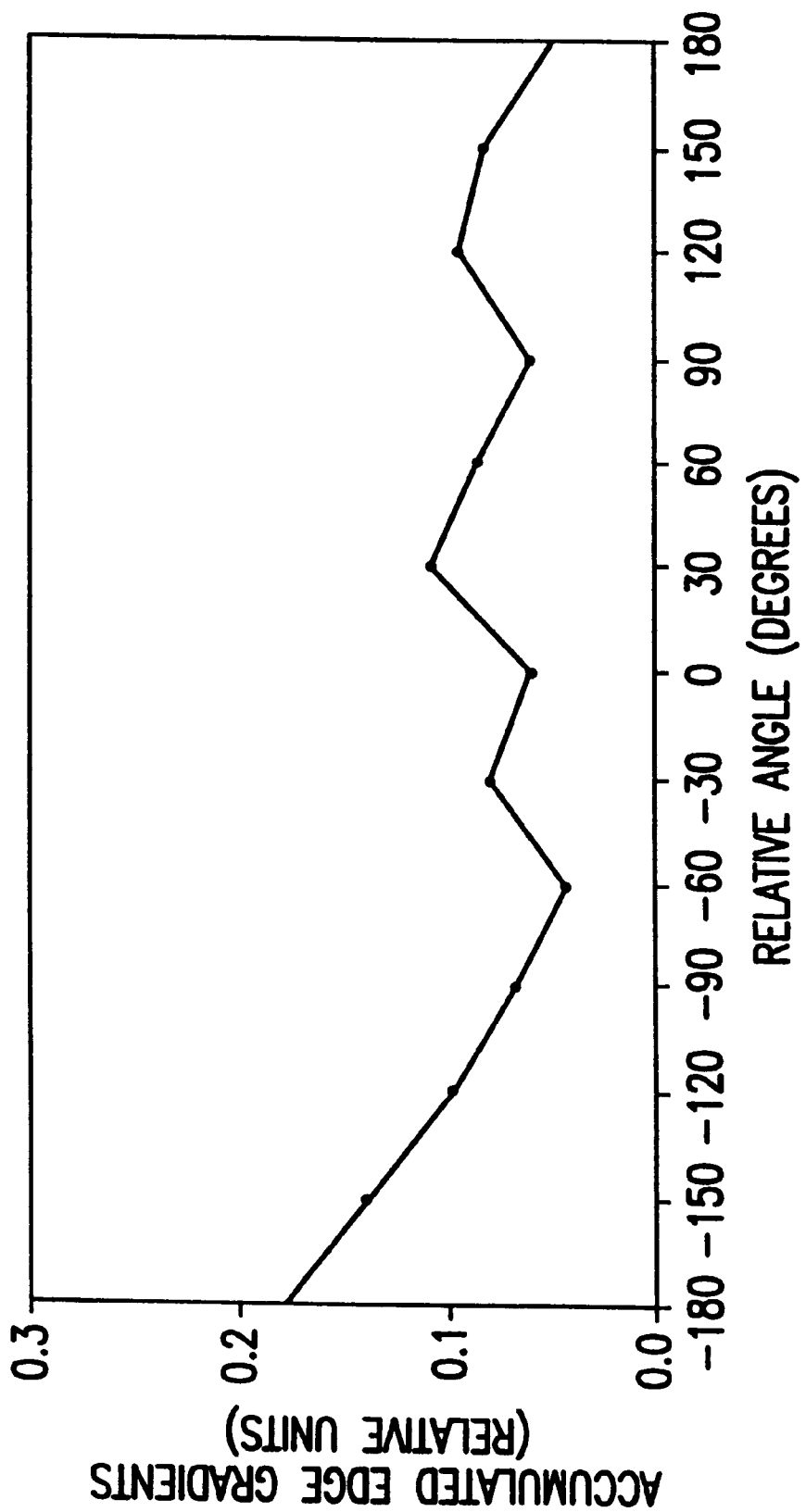
FIG. 5(d) is a graph illustrating the radial edge gradient histogram of the filtered ROI in FIG. 5(c)

For the nodule ROI shown in FIG. 1, there is a prominent peak in the histogram near the radial axis (from −90° to +90°), as illustrated in FIG. 1(d). Therefore, the maximum value and the standard deviation for the nodule tend to be large. On the other hand, if the structures are located around the peripheral areas of the ROI, their edge gradients tend to contribute in two outside ranges of the radial angles, namely, from −180° to −90° and from 90° to 180°, because the edge gradients of peripheral structures generally deviate largely from the radial direction. It is evident in FIG. 1(c) that the nodule shape matched filter enhanced the nodule considerably, which is located at the center of the ROI. Therefore, this resulted in most edge gradients of the ROI (where the major pattern is a nodule at the center) to be distributed near the radial axis. Consequently, the ratio of the maximum value near the radial axis to the corresponding maximum value in the two outside ranges becomes very large.

FIG. 3 shows a false positive ROI which resulted from the interaction between the rib and breast (the soft tissue) shadow. Clearly, the pattern around the center of this ROI did not resemble the shape of the nodular. Consequently, the matched filter used did not enhance the structure around the center of the ROI effectively, as shown in FIG. 3(c). The radial edge gradient histogram obtained from the filtered ROI is illustrated in FIG. 3(d). It is seen that the maximum value near the radial axis is small. On the other hand, the peripheral structures contributed to a large amount of edge gradients in the outside range of the radial angles from −180° to −90°. Therefore, the ratio of the maximum value near the radial axis to that in the two outside ranges became small.

An example of a false positive ROI due to bone crossings (rib—rib or rib-clavicle) is shown in FIG. 4. It is clear that the rib-clavicle crossing in the central area of the ROI was enhanced by the nodule shape matched filter (FIG. 4(c)) because the appearance of the rib-clavicle or rib—rib crossing is generally similar to that of a nodule. This enhancement resulted in a large maximum value near the radial axis, as is shown in FIG. 4(d). However, the bone structures which extend from the center of the ROI to its four corners were also enhanced. The edge gradients of these linear bony patterns could have a wide range of radial angles and thus tend to broaden the histogram width, as shown in FIG. 4(d). In addition, it should be noted that, in FIG. 4(d), the minimum histogram value near the radial axis became large as the width of the histogram increased.

Finally, a false positive ROI resulting from rib-vessel crossings is demonstrated in FIG. 5. The histogram of radial edge gradients included multiple peaks in the range near the radial axis, probably because the patterns of rib-vessel crossings in the central area of the ROI were not uniformly enhanced by the matched filter used, as shown in FIG. 5(c). The standard deviation of the histogram near the radial axis was small. However, the rib and vessel structures on the left side of the ROI contributed a significant amount of edge gradients in the range of radial angles from −180° to −90°, as shown in FIG. 5(d).

FIG. 6 shows the relationship between the histogram width and the difference between the maximum and the minimum value. It is apparent in FIG. 6 that some false positives (mainly due to rib—rib or rib-clavicle crossings) have a large histogram width. About 34 out of 340 false positives (10% of the total number of false positives used in this study) had the histogram width larger than 180 degrees. Also, it is useful to note in FIG. 6 that the difference between the maximum and the minimum value tends to be large for nodules compared with that for some false positives. This is because, as shown in FIG. 7, a nodule was likely to have a histogram with a large maximum value as well as a small minimum value. This result is also consistent with the observation of FIG. 1(d), which presents the histogram of a nodule ROI. Thus if the width of the histogram including both sides from zero degrees of the radial angle, at a histogram value equal to 35% of the difference between the maximum and minimum histogram values exceeds 180°, it is considered that the detected nodule is a false positive and is eliminated from consideration.

Similarly, from FIG. 7, it is seen that no nodules but a substantial number of false positives, about 21% of the false positives (71 of 340), have a minimum value larger than 0.05. Since no nodules have a minimum histogram value larger than 0.05, it is possible to eliminate from consideration as a nodule all such false positives having a minimum histogram value larger than 0.05.

As also seen from FIG. 7, no nodules and a number of false positives have a maximum histogram value less than approximately 0.08. Therefore, it is further possible to eliminate from consideration as a nodule those false positives having a maximum histogram value less than 0.08. At a cutoff value of maximum histogram value equal to 0.08, about 12 of 340 false positives will be removed without loss of nodules. This is about 3.5% reduction of remaining false positives The standard deviation of a histogram indicates the magnitude of its variation. The histogram of a nodule (FIG. 1(d)) usually has a prominent peak near the radial axis and thus results in a large standard deviation. However, histograms of some false positives such as rib-vessel crossings were relatively flat near the radial axis that yielded small standard deviations (see FIG. 5(d)). In FIG. 8, the standard deviation and the partial standard deviation of histograms are compared for nodules and false positives. About 6% (21 of 340)

of false positives and no nodules had a standard deviation below 0.03. It is therefor possible to eliminate from consideration as nodules those false positives having a standard deviation below 0.03. As shown in FIG. 8, it is seen that the standard deviation and the partial standard deviation have some correlation.

The partial average value and the partial standard deviation of the histogram were obtained by ignoring the contribution from those radial edge gradients around the prominent peak. It is noted that the edge gradients around the prominent peak were most likely resulted from the nodule shape pattern (i.e., nodules or rib—rib crossings) at the center of the ROI. Notice also that the appearance of some rib—rib or rib-bone (such as ribclavicle) crossings at the central area of ROI was very similar to that of true nodules. However, these two features, i.e., the partial average value and the partial standard deviation, were related to edge gradients due to structures away from the central area of the ROI. Clearly, the rib—rib crossings such as those seen in FIG. 4, tended to have large partial average values due to the fact that their minimum values near the radial axis were large. A scatter plot for comparison of the partial average value and the partial standard deviation for nodules and false positives is shown in FIG. 9. As evident in FIG. 9, no nodules and about 17% of the total number of false positives (58 of 340) have a partial standard deviation less than 0.005. It is therefor possible to eliminate from consideration as nodules those false positives having a partial standard deviation less than 0.005. It is noted that false positives tend to have a small partial standard deviation or a large partial average value.

From FIG. 9 it is also seen that no nodules and a number of false positives exhibit a partial average value greater than 0.0725. It is therefore possible to eliminate from consideration as a nodule those false positives have a partial average value greater than 0.0725. For the partial average value in FIG. 9, at the cutoff value of 0.0725, about 19 of 340 false positives will be removed without loss of nodules. This is about 5.5% reduction of remaining false positives.

To evaluate the effect of the matched filter used on the central pattern of the ROI, the ratio of the maximum value near the radial axis (from −90° to 90°) to that in the two outside ranges (from −180° to −90° and from 90° to 180°) was calculated. For a nodule located at the central area of the ROI, its pattern could be enhanced more effectively by the matched filter used, thus resulting in a prominent peak in the histogram near the radial axis and a corresponding large ratio. However, for false positives such as soft tissue or some rib-vessel crossings, their structures did not closely match the filter used and had a relatively flat histogram near the radial axis compared with that in the two outside ranges. The ratios tend to be smaller for some false positives than for nodules, as shown in FIG. 10. In fact, no nodules and about 10% of the total number of false positives (34 of 340) have a ratio less than 0.5. Therefore, the ratio is a useful feature, indicating how effective the matched filter is on the central pattern of the ROI, and providing another basis for eliminating from consideration as a nodule all those false positives having a ratio of less than 0.5. It is further noted that the ratios of many rib—rib or rib-clavicle crossings were also large. Ratios of these false positives were overlapped with those of nodules, as shown in FIG. 10. This is because these crossings were also enhanced effectively by the matched filter used.

For the combined sequential rule-based test, a candidate was detected as a nodule by the computer if its features had satisfied all of the test rules one by one. A further reduction of false positives was possible by application of an artificial neural network (ANN) for the remaining 202 false positives. [7,15] The ANN included seven input units corresponding to the seven features derived from the radial edge gradient histogram, five hidden units, and one output unit. A candidate was identified as a "true" nodule or false positive if the output value from the output unit was close to 1 or 0, respectively. A jackknife test [7,15] was employed by training the ANN with one half of the remaining false positives and testing with the other half. It was found that approximately 8% of the remaining false positives were eliminated by the ANN, but with a reduction of 5% of true nodules. Therefore, with the application of the technique of the present invention, it is possible to make a further improvement in the performance of the prior CAD scheme for automated detection of lung nodules on digital chest images.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Figure 11:
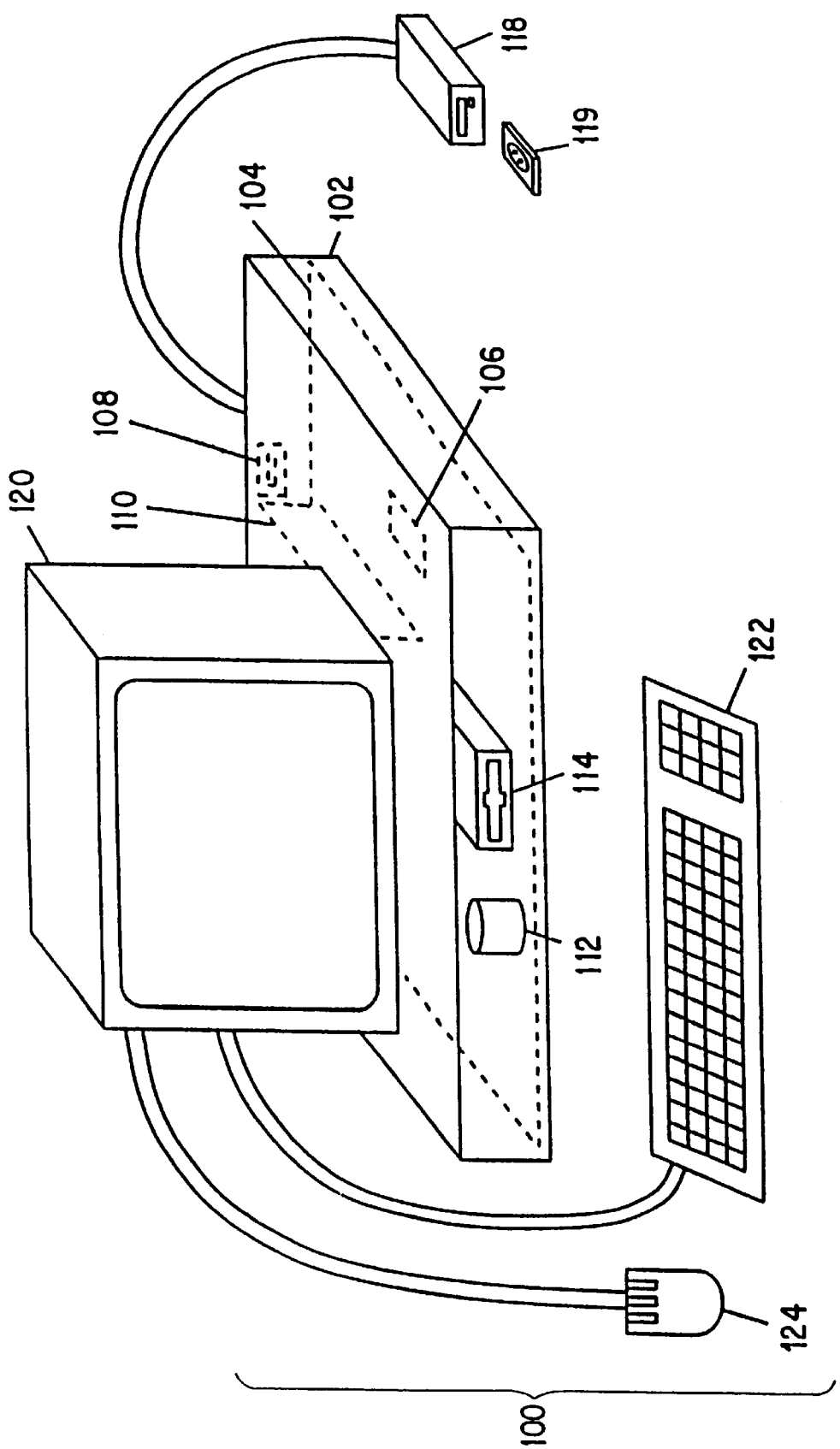
FIG. 11 is a schematic illustration of a general purpose computer 100 programmed according to the teachings of the present invention.

FIG. 11 is a schematic illustration of a general purpose computer 100 programmed according to the teachings of the present invention. The general purpose computer 100 includes a computer housing 102 having a motherboard 104 which contains a CPU 106 and memory 108. The computer 100 also includes plural input devices, e.g., a keyboard 122 and mouse 124, and a display card 110 for controlling monitor 120. In addition, the computer system 100 further includes a floppy disk drive 114 and other removable media devices (e.g., tape, and removable magneto-optical media (not shown)), a hard disk 112, or other fixed, high density media drives, connected using an appropriate device bus, e.g., a SCSI bus or an Enhanced IDE bus. Also connected to the same device bus or another device bus, the computer 100 may additionally include a compact disc reader/writer 118 or a compact disc jukebox (not shown).

Stored on any one of the above described storage medium (computer readable media), the present invention includes programming for controlling both the hardware of the computer 100 and for enabling the computer 100 to interact with a human user. Such programming may include, but is not limited to, software for implementation of device drivers, operating systems, and user applications. Such computer readable media further includes programming or software instructions to direct the general purpose computer 100 to perform tasks in accordance with the present invention.

The programming of general purpose computer 100 may include a software module for digitizing and storing PA radiographs obtained from an image acquisition device. Alternatively, it should be understood that the present invention can also be implemented to process digital data derived from a PA radiograph elsewhere. Otherwise, the computer 100 includes software modules implementing the method of the invention shown in FIG. 12, including preprocessing the image to identify candidate nodules in the image (step 1200); establishing a region of interest (ROI) including a candidate nodule identified in the preprocessing step (step 1210); performing image enhancement of the candidate nodule within the ROI (step 1220); obtaining a histogram of accumulated edge gradients as a function of radial angles within the ROI after performing step 1220 (step 1230); determining whether the candidate nodule is a false positive based on the obtained histogram (step 1240); and eliminating from consideration false positives identified in the determining step (step 1250).

Step 1240 includes determining at least one evaluation factor, including at least one of (1) a maximum histogram value, (2) a minimum histogram value, (3) a partial average value of the histogram, (4) a standard deviation of the histogram values near the radial axis, (5) a partial standard deviation of histogram values, (6) a width of the histogram including both sides from zero degrees of the radial angle, at a predetermined histogram value, and (7) a ratio of a maximum histogram value near the radial axis to a maximum histogram value in two predetermined outside ranges of the radial axis. Step 1250 further includes eliminating said candidate nodule from consideration if the determined at least one evaluation factor for said candidate nodule is greater than, or less than, a predetermined threshold, in dependence on the respective evaluation factor.

Generally, in step 1240 each evaluation factor will be evaluated sequentially, thereby to maximize the number of false positives which can be eliminated from further consideration as a nodule. However, the present invention is not limited to the evaluation of each named evaluation fact, and fewer than all the evaluation factors can be evaluated if economy of processing time or processing capacity is imperative.

Figure 12:
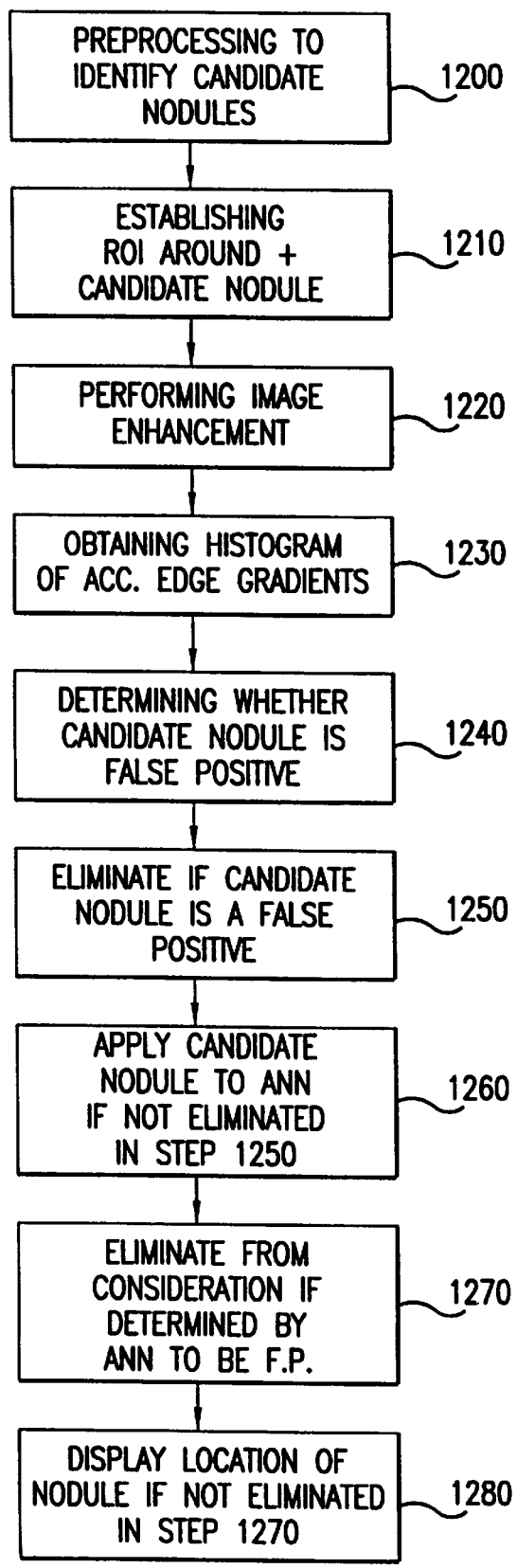
FIG. 12 is a flowchart showing the steps performed according to the method of the invention.

As shown in FIG. 12, the method of the invention further includes step 1260, application of an artificial neural network (ANN) in an effort to identify remaining false positives. In step 1260, a candidate is identified as a "true" nodule or false positive if the output value from the ANN output unit is close to 1 or 0, respectively. In step 1270, those candidates identified as a false positive are also removed from consideration as a nodule, Then, in step 1280, the locations of remaining candidate nodules, i.e. those original candidate nodules remaining after elimination of false positives, are displayed for viewing by a radiologist.

The invention may also be implemented by the preparation of application specific integrated circuits or by interconnecting an appropriate network of conventional component circuits, as will be readily apparent to those skilled in the art.

Recapitulating, the present invention is based on the recognition that the features derived from the analysis of the radial edge gradient histogram are effective in eliminating some subtle and difficult false positives which could not be eliminated by the prior CAD scheme.[7,8] By combining all of the cutoff rules related to these features sequentially, for example, the histogram width larger than 180°, the minimum value larger than 0.05, the standard deviation less than 0.03, the partial standard deviation less than 0.005, and the ratio less than 0.5, a total of 138 (40%) false positives are eliminated without any loss of nodules. For the combined sequential rule-based test, a candidate is detected as a nodule by the computer if its features have satisfied all of the test rules one by one. A further reduction of false positives is possible by application of an artificial neural network (ANN) for the remaining 202 false positives.[7,15] The ANN included seven input units corresponding to the seven features derived from the radial edge gradient histogram, five hidden units, and one output unit. A candidate is identified as a "true" nodule or false positive if the output value from the output unit is close to 1 or 0, respectively. A jackknife test [7,15] is employed by training the ANN with one half of the remaining false positives and testing with the other half. Approximately 8% of the remaining false positives are eliminated by the ANN, but with a reduction of 5% of true nodules. Therefore, with the application of the technique of the present invention, it is possible to make a further improvement in the performance of the prior CAD scheme for automated detection of lung nodules on digital chest images.

Obviously, numerous modifications and variations of the present invention are possible in light of the above teachings. It is therefore to be understood that within the scope of the appended claims, the invention may be practiced otherwise than as specifically described herein.

V. REFERENCES

1 *Cancer facts and figures*—1996, Atlanta: American Cancer Society, 1996.

2 *Annual cancer statistics review: Including cancer trends 1950–1985*, National Cancer Institute, 1988.

3 J. Yerushalmy, "Reliability of chest radiography in the diagnosis of pulmonary lesions," Am. J. Surg. 89, 231–240 (1955).

4 L. W. Guiss and P. Kuenstler, "A retrospective view of survey photofluorograms of persons with lung cancer," Cancer 13, 91–95 (1960).

5 J. V. Forrest and P. J. Friedman, "Radiologic errors in patients with lung cancer," West J. Med. 134, 485–490 (1981).

6 J. R. Muhm, W. E. Miller, R. S. Fontana, D. R. Sanderson, and M. A. Uhlenhopp, "Lung cancer detected during a screening program using four-month radiographs," Radiology 148, 609–615 (1983).

7 X. W. Xu, K. Doi, T. Kobayashi, H. MacMahon, and M. L. Giger, "Development of an improved CAD scheme for automated detection of lung nodules in digital chest images," Med. Phys. 24, 1395–1403 (1997).

8 X. W. Xu, H. MacMahon, M. L. Giger, and K. Doi, "Adaptive feature analysis of false positives for computerized detection of lung nodules in digital chest images" SPIE Medical Imaging 1997, Image Processing Vol. 3034 428–436 (1997).

9 K. Doi, M. L. Giger, H. MacMahon, K. R. Hoffmann, S. Katsuragawa, R. M. Nishikawa, Y. Yoshimura, S. Sanada, X. Chen, C. E. Metz, C. J. Vyborny, R. A. Schmidt, S. M. Montner, T. Matsumoto, and K. G. Chua, "Computer-aided diagnosis: present and future," *A new horizon on medical physics and biomedical engineering* H. Abe, K. Atsumi, T. linuma, M. Saito, and M. Inoue, editors; Elsevier Science Publishers B.V. 1991.

10 K. Doi, M. L. Giger, R. M. Nishikawa, K. R. Hoffmann, H. MacMahon, R. A. Schmidt, and K. G. Chua, "Digital radiography: A useful clinical tool for computer-aided diagnosis by quantitative analysis of radiographic images," Acta Radiologica 34, 426–439 (1993).

11 M. L. Giger, K. Doi, and H. MacMahon, "Image feature analysis and computer-aided diagnosis in digital radiography. 3. Automated detection of nodules in peripheral lung fields," Med. Phys. 15, 158–166 (1988).

12 M. L. Giger, K. Doi, H. MacMahon, C. E. Metz, and F. F. Yin, "Pulmonary nodules: Computer-aided detection in digital chest image," RadioGraphics 10, 41–51 (1990).

13 E. O. Brigham, *The Fast Fourier Transform and its Applications,* Prentice-Hall, Inc. Englewood Cliffs, N.J., 1988.

14 I. Pitas, *Digital Image processing Algorithtm,* Prentice Hall International (UK) Ltd, 1993.

15 Y. C. Wu, K. Doi, M. L. Giger, C. E. Metz, and W. Zhang, "Reduction of false positives in computerized detection of lung nodules in chest radiographs using artificial neural networks, discriminate analysis and a rule-based scheme," J. of Digital Imag 7, 196–207 (1994).

What is claimed as new and desired to be secured by Letters Patent of the United States is:

1. An automated method for analysis of image features in lung nodule detection in a chest radiographic image represented by digital data, comprising:

preprocessing said image to identify at least one candidate nodule in said image;

establishing a region of interest (ROI) including the candidate nodule identified in said preprocessing step;

performing image enhancement of said candidate nodule within said ROI;

obtaining a histogram of accumulated edge gradients as a function of radial angles within said ROI after performing said image enhancement; and determining whether said candidate nodule is a false positive based on the obtained histogram, comprising determining at least one evaluation factor, including determining the maximum histogram value in a predetermined range near the radial axis and eliminating said candidate nodule from consideration as a nodule if the determined maximum histogram value is less than a predetermined value.

2. The method of claim 1, wherein:

said determining step comprises determining a standard deviation of the histogram values near the radial axis of the histogram as an evaluation factor eliminating said candidate nodule from consideration as a nodule if the determined standard deviation is below a predetermined value.

3. The method of claim 1, wherein:

said determining step comprises determining the width of the histogram, including both sides from zero degrees of the radial angle, at a predetermined histogram value as an evaluation factor eliminating said candidate nodule from consideration as a nodule if the determined width of the histogram exceeds a predetermined value.

4. An automated method for analysis of image features in lung nodule detection in a chest radiographic image represented by digital data, comprising:

preprocessing said image to identify at least one candidate nodule in said image;

establishing a region of interest (ROI) including the candidate nodule identified in said preprocessing step;

performing image enhancement of said candidate nodule within said ROI;

obtaining a histogram of accumulated edge gradients as a function of radial angles within said ROI after performing said image enhancement; and determining whether said candidate nodule is a false positive based on the obtained histogram, comprising determining at least one evaluation factor, including a minimum histogram value near the radial axis and eliminating said candidate nodule from consideration as a nodule if the determined minimum histogram value near the radial axis exceeds a predetermined threshold.

5. The method of claim 4, wherein:

said determining step comprises determining a partial standard deviation of histogram values in a portion of the ROI away from a central area of the ROI as an evaluation factor; and said eliminating step comprises eliminating said candidate nodule from consideration as a nodule if the determined partial standard deviation is below a predetermined value.

6. The method of claim 5, wherein:

said determining step comprises determining the width of the histogram, including both sides from zero degrees of the radial angle, at a predetermined histogram value as an evaluation factor; and said eliminating step comprises eliminating said candidate nodule from consideration as a nodule if the determined width of the histogram exceeds a predetermined value.

7. The method of claim 6, wherein:

said determining step comprises determining the ratio of a maximum histogram value near the radial axis to a maximum histogram value in two predetermined outside ranges of the radial axis as an evaluation factor; and said eliminating step comprises eliminating said candidate nodule from consideration as a nodule if the determined ratio is less than a predetermined value.

8. The method of claim 6, wherein:

said determining step comprises determining a standard deviation of the histogram values near the radial axis of the histogram as an evaluation factor; and said eliminating step comprises eliminating said candidate nodule from consideration as a nodule if the determined standard deviation is below a predetermined value.

9. The method of claim 8, wherein:

said determining step comprises determining a standard deviation of the histogram values near the radial axis of the histogram as an evaluation factor; and said eliminating step comprises eliminating said candidate nodule from consideration as a nodule if the determined standard deviation is below a predetermined value.

10. The method of claim 5, wherein:

said determining step comprises determining the ratio of a maximum histogram value near the radial axis to a maximum histogram value in two predetermined outside ranges of the radial axis as an evaluation factor; and said eliminating step comprises eliminating said candidate nodule from consideration as a nodule if the determined ratio is less than a predetermined value.

11. The method of claim 5, wherein:

said determining step comprises determining a standard deviation of the histogram values near the radial axis of the histogram as an evaluation factor; and said eliminating step comprises eliminating said candidate nodule from consideration as a nodule if the determined standard deviation is below a predetermined value.

12. The method of claim 4, wherein:

said determining step comprises determining the width of the histogram, including both sides from zero degrees of the radial angle, at a predetermined histogram value as an evaluation factor; and said eliminating step comprises eliminating said candidate nodule from consideration as a nodule if the determined width of the histogram exceeds a predetermined value.

13. The method of claim 4, wherein:

said determining step comprises determining the ratio of a maximum histogram value near the radial axis to a maximum histogram value in two predetermined outside ranges of the radial axis as an evaluation factor; and said eliminating step comprises eliminating said candidate nodule from consideration as a nodule if the determined ratio is less than a predetermined value.

14. The method of claim 4, wherein:

said determining step comprises determining a standard deviation of the histogram values near the radial axis of the histogram as an evaluation factor; and said eliminating step comprises eliminating said candidate nodule from consideration as a nodule if the determined standard deviation is below a predetermined value.

15. An automated method for analysis of image features in lung nodule detection in a chest radiographic image represented by digital data, comprising:

preprocessing said image to identify at least one candidate nodules in said image;

establishing a region of interest (ROI) including the candidate nodule identified in said preprocessing step;

performing image enhancement of said candidate nodule within said ROI;

obtaining a histogram of accumulated edge gradients as a function of radial angles within said ROI after performing said image enhancement; and determining whether said candidate nodule is a false positive based on the obtained histogram, comprising determining at least one evaluation factor, including a partial average value of the histogram in a portion of the ROI away from a central area of the ROI and eliminating said candidate nodule from consideration as a nodule if the determined partial average value exceeds a predetermined value.

16. An automated method for analysis of image features in lung nodule detection in a chest radiographic image represented by digital data, comprising:

preprocessing said image to identify at least one candidate nodule in said image;

establishing a region of interest (ROI) including the candidate nodule identified in said preprocessing step;

performing image enhancement of said candidate nodule within said ROI;

obtaining a histogram of accumulated edge gradients as a function of radial angles within said ROI after performing said image enhancement; and determining whether said candidate nodule is a false positive based on the obtained histogram, comprising determining at least one evaluation factor including a partial standard deviation of histogram values in a portion of the ROI away from a central area of the ROI and eliminating said candidate nodule from consideration as a nodule if the determined partial standard deviation is below a predetermined value.

17. An automated method for analysis of image features in lung nodule detection in a chest radiographic image represented by digital data, comprising:

preprocessing said image to identify at least one candidate nodule in said image;

establishing a region of interest (ROI) including the candidate nodule identified in said preprocessing step;

performing image enhancement of said candidate nodule within said ROI;

obtaining a histogram of accumulated edge gradients as a function of radial angles within said ROI after performing said image enhancement; and determining whether said candidate nodule is a false positive based on the obtained histogram, comprising determining at least one evaluation factor, including a ratio of a maximum histogram value near the radial axis to a maximum histogram value in two predetermined outside ranges of the radial axis and eliminating said candidate nodule from consideration as a nodule if the determined ratio is less than a predetermined value.

18. The method of claim 1, 4, 15, 16 or 17, further comprising:

applying said candidate nodule to an artificial neural network (ANN) and identifying said candidate as a nodule or false positive if an output value from an ANN output unit is close to 1 or 0, respectively.

19. The method of claim 18, further comprising:

displaying a location of the candidate identified as a nodule.

20. An automated method for analysis of image features in lung nodule detection in a chest radiographic image represented by digital data, comprising:

preprocessing said image to identify at least one candidate nodule in said image;

establishing a region of interest (ROI) including the candidate nodule identified in said preprocessing step;

performing image enhancement of said candidate nodule within said ROI, comprising removing image background from said ROI;

obtaining a histogram of accumulated edge gradients as a function of radial angles within said ROI after performing said image enhancement; and determining whether said candidate nodule is a false positive based on the obtained histogram;

wherein said step of removing image background comprises:

determining the average of the pixel values along a column and along a row intersecting said candidate nodule; and subtracting said average from pixel values of pixels within said ROI.

21. The method of claim 20, wherein said step of performing image enhancement comprises:

performing shape matched filtering on pixels in said ROI including said candidate nodule.

22. The method of claim 21, wherein said step of performing shape matched filtering comprises:

performing said shape matched filtering in the frequency domain using a fast Fourier Transform (FFT).

23. The method of claims 1, 4, 15, 16 or 17, wherein said step of obtaining a histogram comprises:

calculating an edge gradient at each pixel using a 3×3 Sobel filter; and accumulating edge gradients from all pixels in the ROI, at each bin of different radial angles.

24. An automated method for analysis of image features in lung nodule detection in a chest radiographic image represented by digital data, comprising:

preprocessing said image to identify at least one candidate nodule in said image;

establishing a region of interest (ROI) including the candidate nodule identified in said preprocessing step;

performing image enhancement of said candidate nodule within said ROI;

obtaining a histogram of accumulated edge gradients as a function of radial angles within said ROI after performing said image enhancement; and determining whether said candidate nodule is a false positive based on the obtained histogram, comprising determining plural evaluation factors, including each of (1) a maximum histogram value, (2) a minimum histogram value, (3) a partial average value of the histogram, (4) a standard deviation of the histogram values near the radial axis, (5) a partial standard deviation of histogram values, (6) a width of the histogram including both sides from zero degrees of the radial angle, at a predetermined histogram value, and (7) a ratio of a maximum histogram value near the radial axis to a maximum histogram value in two predetermined outside ranges of the radial axis and eliminating said candidate nodule from consideration as a nodule if one of the determined evaluation factors for said candidate nodule have respective values on a predetermined respective side of a predetermined respective threshold value.

25. A computer readable medium storing computer instructions for identification of nodules in a chest radiographic image represented by digital data, by performing the steps of:

preprocessing said image to identify at least one candidate nodule in said image;

establishing a region of interest (ROI) including the candidate nodule identified in said preprocessing step;

performing image enhancement of said candidate nodule within said ROI;

obtaining a histogram of accumulated edge gradients as a function of radial angles within said ROI after performing said image enhancement; and determining whether said candidate nodule is a false positive based on the obtained histogram, comprising determining at least one evaluation factor, including the maximum histogram value in a predetermined range near the radial axis and eliminating said candidate nodule from consideration as a nodule if the determined maximum histogram value is less than a predetermined value.

26. The computer readable medium of claim 25, wherein:
said determining step comprises determining a standard deviation of the histogram values near the radial axis of the histogram as an evaluation factor eliminating said candidate nodule from consideration as a nodule if the determined standard deviation is below a predetermined value.

27. The computer readable medium of claim 25, wherein:
said determining step comprises determining the width of the histogram, including both sides from zero degrees of the radial angle, at a predetermined histogram value as an evaluation factor eliminating said candidate nodule from consideration as a nodule if the determined width of the histogram exceeds a predetermined value.

28. A computer readable medium storing computer instructions for identification of nodules in a chest radiographic image represented by digital data, by performing the steps of:

preprocessing said image to identify at least one candidate nodule in said image;

establishing a region of interest (ROD including the candidate nodule identified in said preprocessing step;

performing image enhancement of said candidate nodule within said ROI;

obtaining a histogram of accumulated edge gradients as a function of radial angles within said ROI after performing said image enhancement; and determining whether said candidate nodule is a false positive based on the obtained histogram, comprising determining at least one evaluation factor, including a minimum histogram value near the radial axis and eliminating said candidate nodule from consideration as a nodule if the determined minimum histogram value near the radial axis exceeds a predetermined threshold.

29. The computer readable medium of claim 28, wherein:
said determining step comprises determining a partial standard deviation of histogram values in a portion of the ROI away from a central area of the ROI as an evaluation factor and eliminating said candidate nodule from consideration as a nodule if the determined partial standard deviation is below a predetermined value.

30. The computer readable medium of claim 29, wherein:
said determining step comprises determining the width of the histogram, including both sides from zero degrees of the radial angle, at a predetermined histogram value as an evaluation factor and eliminating said candidate nodule from consideration as a nodule if the determined width of the histogram exceeds a predetermined value.

31. The computer readable medium of claim 30, wherein:
said determining step comprises determining the ratio of a maximum histogram value near the radial axis to a maximum histogram value in two predetermined outside ranges of the radial axis as an evaluation factor and eliminating said candidate nodule from consideration as a nodule if the determined ratio is less than a predetermined value.

32. The computer readable medium of claim 30, wherein:
said determining step comprises determining a standard deviation of the histogram values near the radial axis of the histogram as an evaluation factor and eliminating said candidate nodule from consideration as a nodule if the determined standard deviation is below a predetermined value.

33. The computer readable medium of claim 32, wherein:
said determining step comprises determining a standard deviation of the histogram values near the radial axis of the histogram as an evaluation factor and eliminating said candidate nodule from consideration as a nodule if the determined standard deviation is below a predetermined value.

34. The computer readable medium of claim 29, wherein:
said determining step comprises determining the ratio of a maximum histogram value near the radial axis to a maximum histogram value in two predetermined outside ranges of the radial axis as an evaluation factor and eliminating said candidate nodule from consideration as a nodule if the determined ratio is less than a predetermined value.

35. The computer readable medium of claim 29, wherein:
said determining step comprises determining a standard deviation of the histogram values near the radial axis of the histogram as an evaluation factor and eliminating said candidate nodule from consideration as a nodule if the determined standard deviation is below a predetermined value.

36. The computer readable medium of claim 28, wherein:
said determining step comprises determining the width of the histogram, including both sides from zero degrees of the radial angle, at a predetermined histogram value as an evaluation factor and eliminating said candidate nodule from consideration as a nodule if the determined width of the histogram exceeds a predetermined value.

37. The computer readable medium of claim 28, wherein:
said determining step comprises determining the ratio of a maximum histogram value near the radial axis to a maximum histogram value in two predetermined outside ranges of the radial axis as an evaluation factor and eliminating said candidate nodule from consideration as a nodule if the determined ratio is less than a predetermined value.

38. The computer readable medium of claim 28, wherein:
said determining step comprises determining a standard deviation of the histogram values near the radial axis of the histogram as an evaluation factor and eliminating said candidate nodule from consideration as a nodule if the determined standard deviation is below a predetermined value.

39. A computer readable medium storing computer instructions for identification of nodules in a chest radiographic image represented by digital data, by performing the steps of:
preprocessing said image to identify at least one candidate nodule in said image;
establishing a region of interest (ROI) including the candidate nodule identified in said preprocessing step;
performing image enhancement of said candidate nodule within said ROI;
obtaining a histogram of accumulated edge gradients as a function of radial angles within said ROI after performing said image enhancement; and
determining whether said candidate nodule is a false positive based on the obtained histogram, comprising determining at least one evaluation factor, including a partial average value of the histogram in a portion of the ROI away from a central area of the ROI and eliminating said candidate nodule from consideration as a nodule if the determined partial average value exceeds a predetermined value.

40. A computer readable medium storing computer instructions for identification of nodules in a chest radiographic image represented by digital data, by performing the steps of:
preprocessing said image to identify at least one candidate nodule in said image;
establishing a region of interest (ROI) including the candidate nodule identified in said preprocessing step;
performing image enhancement of said candidate nodule within said ROI;
obtaining a histogram of accumulated edge gradients as a function of radial angles within said ROI after performing said image enhancement; and
determining whether said candidate nodule is a false positive based on the obtained histogram, comprising determining at least one evaluation factor, including a partial standard deviation of histogram values in a portion of the ROI away from a central area of the ROI and eliminating said candidate nodule from consideration as a nodule if the determined partial standard deviation is below a predetermined value.

41. A computer readable medium storing computer instructions for identification of nodules in a chest radiographic image represented by digital data, by performing the steps of:
preprocessing said image to identify at least one candidate nodule in said image;
establishing a region of interest (ROI) including the candidate nodule identified in said preprocessing step;
performing image enhancement of said candidate nodule within said ROI;
obtaining a histogram of accumulated edge gradients as a function of radial angles within said ROI after performing said image enhancement; and
determining whether said candidate nodule is a false positive based on the obtained histogram, comprising determining at least one evaluation factor, including a ratio of a maximum histogram value near the radial axis to a maximum histogram value in two predetermined outside ranges of the radial axis and
eliminating said candidate nodule from consideration as a nodule if the determined ratio is less than a predetermined value.

42. The computer readable medium of claims 25, 28, 39, 40 or 41, further comprising:
applying said candidate nodule to an artificial neural network (ANN) and identifying said candidate as a nodule or false positive if an output value from an ANN output unit is close to 1 or 0, respectively.

43. The computer readable medium of claim 42, further comprising:
displaying a location of the candidate identified as a nodule.

44. A computer readable medium storing computer instructions for identification of nodules in a chest radiographic image represented by digital data, by performing the steps of:
preprocessing said image to identify at least one candidate nodule in said image;
establishing a region of interest (ROI) including the candidate nodule identified in said preprocessing step;
performing image enhancement of said candidate nodule within said ROI, comprising removing image background from said ROI;
obtaining a histogram of accumulated edge gradients as a function of radial angles within said ROI after performing said image enhancement; and
determining whether said candidate nodule is a false positive based on the obtained histogram;
wherein said step of removing image background comprises:
determining the average of the pixel values along a column and along a row intersecting said candidate nodule; and
subtracting said average from pixel values of pixels within said ROI.

45. The computer readable medium of claim 44, wherein said step of performing image enhancement comprises:
performing shape matched filtering on pixels in said ROI including said candidate nodule.

46. The computer readable medium of claim 45, wherein said step of performing shape matched filtering comprises:
performing said shape matched filtering in the frequency domain using a fast Fourier Transform (FFT).

47. The computer readable medium of claims 25, 28, 39, 40 or 4, wherein said step of obtaining a histogram comprises:
calculating an edge gradient at each pixel using a 3×3 Sobel filter; and accumulating edge gradients from all pixels in the ROI, at each bin of different radial angles.

48. A computer readable medium storing computer instructions for identification of nodules in a chest radiographic image represented by digital data, by performing the steps of:

preprocessing said image to identify at least one candidate nodule in said image;

establishing a region of interest (ROI) including the candidate nodule identified in said preprocessing step;

performing image enhancement of said candidate nodule within said ROI;

obtaining a histogram of accumulated edge gradients as a function of radial angles within said ROI after performing said image enhancement; and determining whether said candidate nodule is a false positive based on the obtained histogram, comprising determining plural evaluation factors, including each of (1) a maximum histogram value, (2) a minimum histogram value, (3) a partial average value of the histogram, (4) a standard deviation of the histogram values near the radial axis, (5) a partial standard deviation of histogram values, (6) a width of the histogram including both sides from zero degrees of the radial angle, at a predetermined histogram value, and (7) a ratio of a maximum histogram value near the radial axis to a maximum histogram value in two predetermined outside ranges of the radial axis and eliminating said candidate nodule from consideration as a nodule if one of the determined evaluation factors for said candidate nodule have respective values on a predetermined respective side of a predetermined respective threshold value.

* * * * *